United States Patent
Yanagimachi

(10) Patent No.: US 12,401,423 B2
(45) Date of Patent: Aug. 26, 2025

(54) OPTICAL NETWORK, NETWORK MANAGEMENT DEVICE, AND NETWORK MANAGEMENT METHOD

(71) Applicant: NEC Corporation, Tokyo (JP)

(72) Inventor: Shigeyuki Yanagimachi, Tokyo (JP)

(73) Assignee: NEC CORPORATION, Tokyo (JP)

(*) Notice: Subject to any disclaimer, the term of this patent is extended or adjusted under 35 U.S.C. 154(b) by 103 days.

(21) Appl. No.: 18/024,207

(22) PCT Filed: Aug. 20, 2021

(86) PCT No.: PCT/JP2021/030524
§ 371 (c)(1),
(2) Date: Mar. 1, 2023

(87) PCT Pub. No.: WO2022/054536
PCT Pub. Date: Mar. 17, 2022

(65) Prior Publication Data
US 2023/0361875 A1    Nov. 9, 2023

(30) Foreign Application Priority Data
Sep. 14, 2020 (JP) ................ 2020-153426

(51) Int. Cl.
*H04B 10/2581* (2013.01)
*H04B 10/032* (2013.01)
(Continued)

(52) U.S. Cl.
CPC ....... *H04B 10/2581* (2013.01); *H04B 10/032* (2013.01); *H04J 14/052* (2023.08); *H04Q 11/0067* (2013.01)

(58) Field of Classification Search
CPC ...................... H04B 10/2581; H04B 10/32
See application file for complete search history.

(56) References Cited

U.S. PATENT DOCUMENTS

2011/0176804 A1    7/2011  Binkert et al.
2014/0241712 A1*  8/2014  Sugawara ............ G02B 6/3528
                                                      398/5
(Continued)

FOREIGN PATENT DOCUMENTS

JP    2014-165595 A    9/2014
JP    2016-111480 A    6/2016
WO    2010/016819 A1   2/2010

OTHER PUBLICATIONS

M. Jinno, "Spatial Channel Network (SCN) Architecture Employing Growable and Reliable Spatial Channel Cross-Connects Toward Massive SDM Era," 2018 Photonics in Switching and Computing (PSC), Limassol, Cyprus, 2018, pp. 1-3, doi: 10.1109/PS.2018.8751483. (Year: 2018).*

(Continued)

*Primary Examiner* — Nathan M Cors

(57) ABSTRACT

In a network using MCF, in order to provide a technology which enables a standby system path to be easily constructed, this optical network includes: an active system path which is connected by means of a first multi-core optical fiber, and is a path between a transmission node that transmits an optical signal and a reception node that receives the optical signal; and the standby system path which is composed by means of a plurality of second multi-core optical fibers, which are different from the first multi-core optical fiber, and is a path switchable from the active system path between the transmission node and the reception node, wherein cores, which are switching destinations of the plurality of cores of the first multi-core optical fiber, are disposed at a plurality of respective unused cores of the second multi-core optical fibers.

11 Claims, 17 Drawing Sheets

(51) Int. Cl.
  *H04J 14/00*   (2006.01)
  *H04Q 11/00*   (2006.01)

(56) References Cited

U.S. PATENT DOCUMENTS

| | | | | |
|---|---|---|---|---|
| 2018/0337726 A1* | 11/2018 | Oda | .................. | H04B 10/2581 |
| 2020/0044740 A1* | 2/2020 | Giorgi | ................. | H04J 14/0216 |
| 2022/0308301 A1* | 9/2022 | Xu | ...................... | H04J 14/0213 |
| 2023/0122793 A1* | 4/2023 | Zhang | .................. | H04J 14/052 |
| | | | | 359/313 |

OTHER PUBLICATIONS

International Search Report for PCT Application No. PCT/JP2021/030524, mailed on Oct. 26, 2021.
English translation of Written opinion for PCT Application No. PCT/JP2021/030524, mailed on Oct. 26, 2021.

* cited by examiner

OPTICAL NETWORK, NETWORK MANAGEMENT DEVICE, AND NETWORK MANAGEMENT METHOD

This application is a National Stage Entry of PCT/JP2021/030524 filed on Aug. 20, 2021, which claims priority from Japanese Patent Application 2020-153426 filed on Sep. 14, 2020, the contents of all of which are incorporated herein by reference, in their entirety.

TECHNICAL FIELD

The present invention relates to an optical network, a network management device, and a network management method, and particularly relates to an optical network, a network management device, and a network management method that use a multicore optical fiber.

BACKGROUND ART

In a field of core network, development of a wavelength division multiplexing (WDM) system in which a plurality of optical signals having different wavelength are multiplexed and transmitted through one optical fiber has been in progress. However, since the number of wavelengths that can be used in a WDM system is limited, there is limitation on increasing communication capacity by using the WDM system.

Under such a situation, development of a multicore optical fiber (MCF) in which a plurality of cores are packed in one clad is in progress for a purpose of increasing transmission capacity per optical fiber. FIG. 14 illustrates a cross-sectional view of a typical seven-core MCF 90. Six cores 92 are disposed around a central core 91. Each of the seven cores can independently transmit an optical signal. Therefore, it can be expected that, with an MCF, transmission capacity per optical fiber is increased in comparison with a typical single mode optical fiber (SMF).

Further, MCF is broadly classified into an "uncoupled multicore fiber" and a "coupled multicore fiber". FIG. 15 illustrates a cross-sectional view of a typical four-core uncoupled multicore fiber 94. FIG. 16 illustrates a cross-sectional view of a typical coupled multicore fiber 95. The uncoupled multicore fiber 94 and the coupled multicore fiber 95 both include four cores 92 in a clad 93. The uncoupled multicore fiber 94 has a wider space between the cores 92 than that in the coupled multicore fiber 95, and can thereby reduce effect of crosstalk between the cores. In the uncoupled multicore fiber 94, since each core can be used as an independent optical transmission path, an optical communication technique that is developed for an SMF can be used without modification. Meanwhile, the coupled multicore fiber 95 has a narrower space between the cores, and thereby more cores 92 can be packed in the clad 93. However, when the coupled multicore fiber 95 is used in an optical transmission system, crosstalk caused between the cores 92 may be increased. Therefore, it is necessary to suppress crosstalk between signals propagating in different cores by performing, in an optical receiver, multi-input multi-output (MIMO) processing using a digital signal processor (DSP) and the like.

FIG. 17 is a diagram illustrating a typical network 900 using an MCF. The network 900 has three ring networks 951 to 953. The ring network 951 includes nodes 901 to 904, the ring network 952 includes nodes 905 to 908, and the ring network 953 includes nodes 909 to 912. The ring networks 951 to 953 are connected with one another by a link between the node 903 and the node 906, a link between the node 904 and the node 910, and a link between the node 905 and the node 911. Each link between the nodes 901 to 912 is an MCF.

When a communication failure due to disconnection of an optical fiber or the like occurs in an active system path in the network 900, a communication path switches from the active system path to a standby system path. Thereby, communication between the nodes is continued. For example, in FIG. 17, an active system path connecting the node 901 and the node 908 is via the nodes 904, 910, 911, and 905 (solid arrow). When an MCF is disconnected between the node 910 and the node 911 (× mark), the active system path is switched to a standby system path (standby system path, dashed line arrow) which is via the nodes 902, 903, 906, and 907. Consequently, communication between the node 901 and the node 908 is maintained.

Related to the present invention, PTLs 1 and 2 disclose a technique for switching a path in a network using an MCF.

CITATION LIST

Patent Literature

[PTL 1] Japanese Unexamined Patent Application Publication No. 2016-111480
[PTL 2] Japanese Unexamined Patent Application Publication No. 2014-165595

SUMMARY OF INVENTION

Technical Problem

In a typical optical transmission system using an MCF, an MCF of a standby system path is prepared in such a way that an optical signal in each core of one MCF in an active system path is still transmitted through one MCF even in the standby system path. Specifically, an MCF of an active system corresponds one-to-one to an MCF of a standby system, and the MCF of the standby system is not used when the active system path is normal. Specifically, a typical optical transmission system requires an MCF for the standby system path. In particular, since an MCF is expensive in comparison with an SMF, installation cost of an entire network increases.

Object of Invention

An object of the present invention is to provide a technique that enables easy construction of a standby system path in a network using an MCF.

Solution to Problem

An optical network according to the present invention includes an active system path being a path between a transmission node that transmits an optical signal and a reception node that receives the optical signal being connected by a first multicore optical fiber, and a standby system path being a path connecting the transmission node and the reception node while including a plurality of second multicore optical fibers different from the first multicore optical fiber, and disposes a core to which a plurality of cores of the first multicore optical fiber are to be switched, at each of a plurality of unused cores of the second multicore optical fiber.

A network management device according to the present invention is a network management device used in an optical network including an active system path being a path between a transmission node and a reception node being connected by a multicore optical fiber, and a standby system path being a path, between the transmission node and the reception node, that is able to be switched from the active system path, and disposes a core to which a plurality of cores of the active system path are to be switched, at each of a plurality of unused cores of the multicore optical fiber.

A network management method according to the present invention includes a procedure of disposing, in an optical network including an active system path being a path between a transmission node and reception node being connected by a multicore optical fiber, and a standby system path being a path, between the transmission node and the reception node, that is able to be switched from the active system path, a core to which a plurality of cores of the active system path are to be switched, at each of a plurality of unused cores of the multicore optical fiber.

Advantageous Effects of Invention

The present invention enables easy construction of a standby system path in a network using an MCF.

EXAMPLE EMBODIMENT

First Example Embodiment

Figure 1:
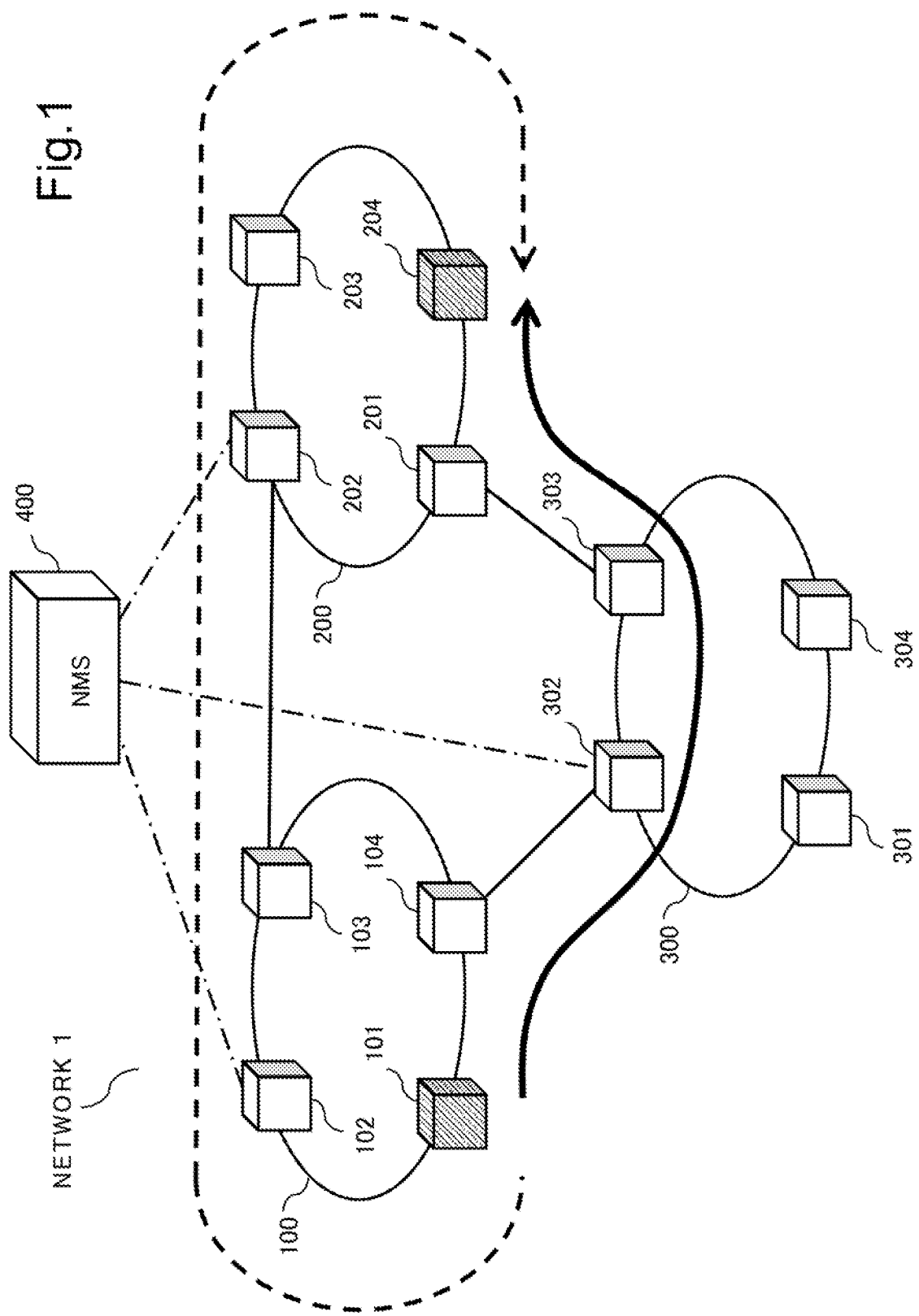
FIG. 1 is a diagram illustrating a configuration example of a network 1 according to a first example embodiment.

FIG. 1 is a diagram illustrating a configuration example of a network 1 according to a first example embodiment of the present invention. The network 1 is an optical transmission system in which a plurality of nodes 101 to 104, 201 to 204, and 301 to 304 are connected to each other by MCFs. The network 1 includes three networks 100, 200, and 300. The networks 100 to 300 are all ring networks. The network 100 includes the nodes 101 to 104. The network 200 includes the nodes 201 to 204. The network 300 includes the nodes 301 to 304. Adjacent nodes are connected by a plurality of MCFs. Each node in the network 1 bidirectionally communicates with adjacent nodes via cores included in connected MCFs. Further, each node may include a transponder (optical transceiver) and may be connected to another network or a terminal via an unillustrated line.

The network 100 and the network 200 are connected to each other by a link connecting the node 103 and the node 202. The network 100 and the network 300 are connected to each other by a link connecting the node 104 and the node 302. The network 200 and the network 300 are connected to each other by a link connecting the node 201 and the node 303. Note that, an optical amplifier for compensating transmission loss of an optical fiber may be connected between each node.

A network management system (NMS) 400 is a network management device, and is communicably connected to each node of the network 1 via a monitoring line. The NMS 400 is, for example, a server. The NMS 400 monitors a status of each node constituting the network 1, and controls each node according to a state of the network 1. For example, when a failure occurs in any node or any MCF, the NMS 400 controls a node that relates to the failure, and changes a path in such a way as to bypass a section in which the failure occurs.

Figure 2:
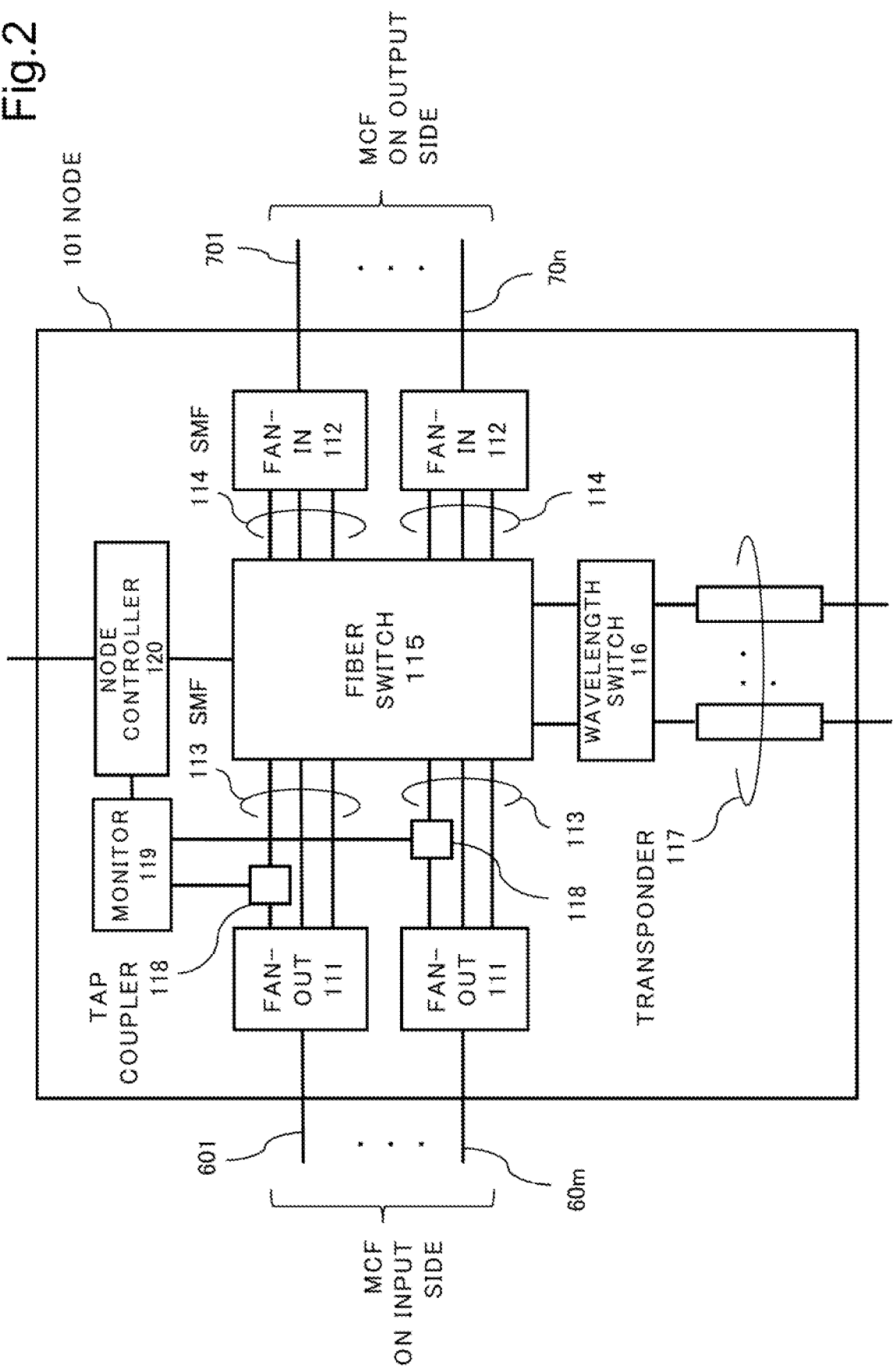
FIG. 2 is a block diagram illustrating a configuration example of a node 101.

FIG. 2 is a block diagram illustrating a configuration example of the node 101. Since other nodes are also provided with a configuration similar to that of the node 101, description on other nodes is omitted. The node 101 includes m fan-outs 111, n fan-ins 112, SMFs 113 to 114, a fiber switch 115, a wavelength switch 116, and a transponder 117. Herein, m and n are integers equal to or more than 2, and m and n is determined according to a configuration of the network 1.

The node 101 is connected to m MCFs 601 to 60*m* on an input side, and is connected to n MCFs 701 to 70*n* on an output side. The node 101 receives an optical signal from the MCFs 601 to 60*m*, and outputs an optical signal to the MCFs 701 to 70*n*. For example, in the node 101, the MCFs 601 to 60*m* and the MCFs 701 to 70*n* are respectively connected to the nodes 102 and 104 in such a way as to bidirectionally communicate with the adjacent nodes 102 and 104. Specifically, some of the MCFs 601 to 60*m* on the input side of the node 101 are connected to some of MCFs on an output side of the node 102. Further, some of the MCFs 701 to 70*n* on the output side of the node 101 are connected to some of MCFs on an input side of the node 102. The same applies to connection between the node 101 and the node 104. Further, other nodes in the network 1 are also connected by an MCF in such a way that adjacent nodes can communicate bidirectionally.

The fan-out 111 is an optical component, and separates an optical signal that has propagated through each core of the MCFs 601 to 60*m* by core unit. The SMF 113 is connected to an output of the fan-out 111 in such a way as to correspond to each core of an MCF that is connected to the fan-out 111. When the number of cores of the MCF 601 is seven, the MCF 601 is connected to seven SMFs 113 via the fan-out 111. The SMF 113 guides the optical signal separated by the fan-out 111 to the fiber switch 115 for each core.

The fiber switch 115 switches a path of each optical signal input from each of the SMFs 113, and outputs each optical signal to each of the SMFs 114 or an optical receiver of the transponder 117. Further, the fiber switch 115 associates an optical signal input from the SMF 113 and the transponder 117 with each core of the MCFs 701 to 70*n*, and output the optical signal from the SMF 114. Herein, the fiber switch 115 couples, via the wavelength switch 116, an optical signal transmitted and received by the transponder 117 transmits and receives with the SMF 113 or 114.

The wavelength switch 116 sets, for each wavelength, a path for an optical signal between the fiber switch 115 and a plurality of the transponder 117. Each of the transponders 117 transmits and receives an optical signal having a predetermined wavelength. The wavelength switch is an optical switch for selecting one of the transponders 117, according to a wavelength of an optical signal that is transmitted and received by the node 101. Note that, in FIG. 1, illustration of a line for connecting a terminal and the like that is installed outside each node to the transponder 117 is omitted.

The SMF 114 outputs an output from the fiber switch 115 to the fan-in 112. The fan-in 112 couples a plurality of optical signals guided by the SMFs 114 with cores of the MCFs 701-70*n*. Details of an operation of the fiber switch 115 is described later.

The node 101 further includes a tap coupler 118, a monitor 119, and a node controller 120. The tap coupler 118 splits some of optical signals propagating through the SMF 113. The tap coupler 118 is, for example, an optical directional coupler. It is not required that the tap coupler 118 is provided in all of the plurality of SMFs 113. At least one tap coupler 118 is provided for each of the MCFs 601 to 60*m* on the input side. The monitor 119 monitors an optical signal split by the tap coupler 118 and generates a monitor signal. The monitor signal indicates, for each of the MCFs 601 to 60*m*, intensity of an optical signal received by the node 101. When intensity of the monitor signal is low, it can be estimated that there is an abnormality in an optical signal received from an MCF provided with a relevant tap coupler. The monitor 119 is a photoelectric conversion circuit and converts an optical signal input from the tap coupler 118 into a monitor signal, which is an electric signal, and outputs the monitor signal to the node controller 120.

The node controller 120 is an electric circuit, and controls the entire node 101 including the fiber switch 115 and the wavelength switch 116, according to a monitor signal. The node controller 120 sets an input/output relationship between the SMF 113, SMF 114, and the transponder 117, in response to an instruction from the NMS 400. The node controller 120 controls the fiber switch 115 in such a way that an optical signal is transmitted from a transmission node to a reception node through a predetermined path. The transmission node is an origin of the path, and a node from which the transponder 117 transmits an optical signal. The reception node is an end of the path, and a node in which the transponder 117 receives the optical signal transmitted by the transmission node. The NMS 400 holds, for each pair of the transmission node and the reception node, information on a node that the path passes through, as path information. The NMS 400 controls, according to the path information, the node controller 120 of each node in such a way that the path is configured. By configuring the path, data from a terminal and the like connected to the transponder 117 of the transmission node is transmitted to the transponder 117 of the reception node, as an optical signal. The transponder 117 of the reception node regenerates data from the received optical signal, and transmits the data to a terminal and the like connected to the transmission node.

Note that, as another form of the network 1, a point-to-point network in which nodes transmit and receive an optical signal are disposed in such a way as to face each other, a ring network in which nodes are disposed on a circle, a mesh network in which nodes are connected to each other in a mesh-like pattern, and the like. The network 1 according to the present example embodiment exemplifies a configuration in which a plurality of ring networks are connected to each other. However, this does not limit the example embodiment.

Description of Operation

Figure 3:
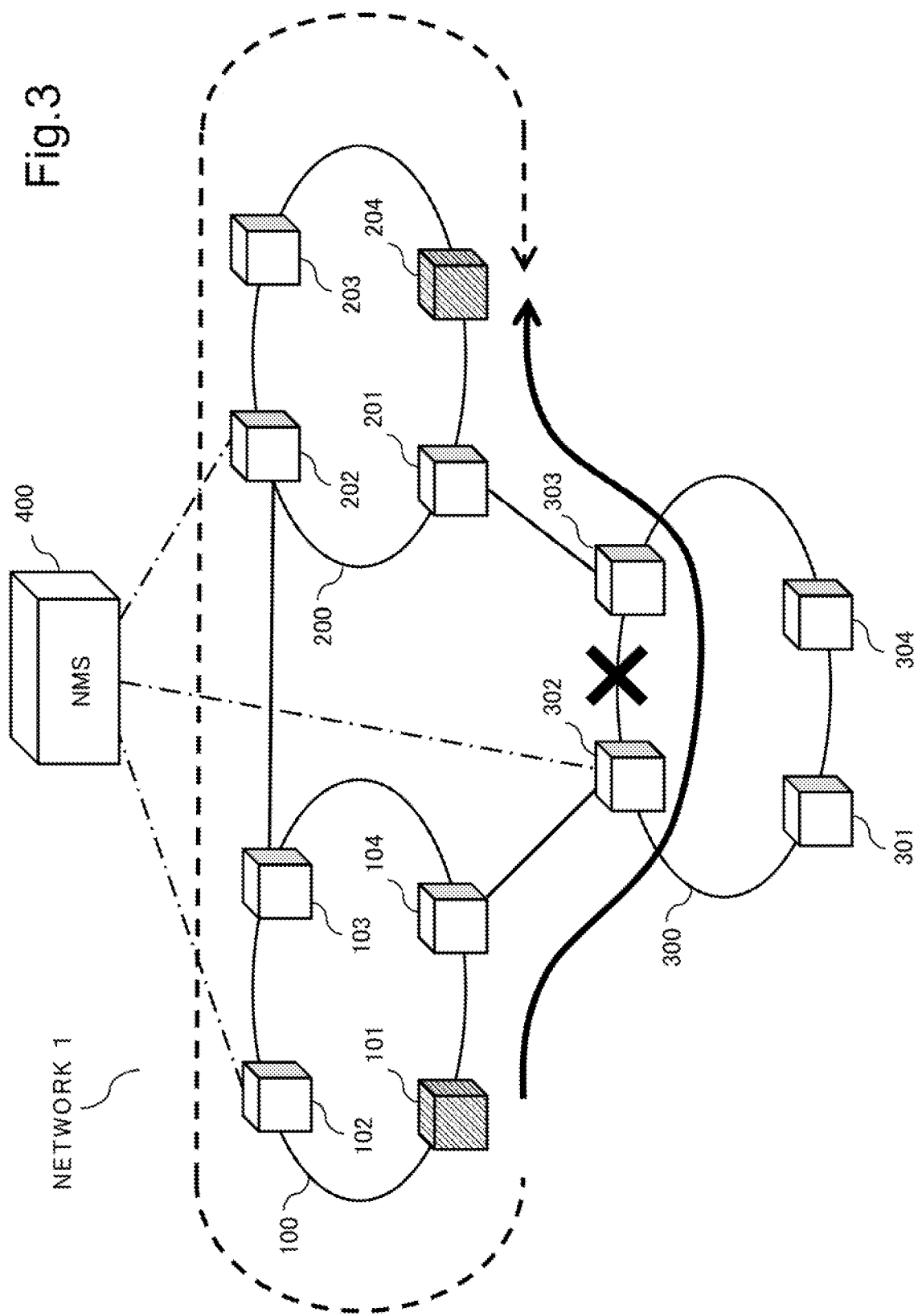
FIG. 3 is a diagram for explaining an example of switching from an active system to a standby system in the network 1 according to the first example embodiment.

FIG. 3 is a diagram for explaining an example of switching from an active system to a standby system in the network 1. FIG. 3 illustrates an example in which the transmission node is the node 101 and the reception node is the node 204. An active system path (solid line) connects the node 101 and the node 204 via the node 104, the node 302, the node 303, and the node 201. As described above, the fiber switch 115 of each node on the path is set in such a way that the active system path is configured based on path information held by the NMS 400. For example, when operating on the active system path, the node 101 is controlled in such a way that a transmission signal of the transponder 117 of the node 101 is transmitted to the node 104 via the MCF 701. The fiber switches 115 of the node 104, the node 302, and the node 303 are controlled in such a way that a transmission signal of the transponder 117 is transmitted to the node 204 via the active system path. The node 204 is controlled in such a way that an optical signal transmitted by the transponder 117 of the node 101 is received by the transponder 117 of the node 204.

Here, when a failure occurs in an MCF between the node 302 and the node 303 (× mark), the path connecting the node 101 and the node 204 is switched to a standby system path. The standby system path (dashed line) connects the node 101 and the node 204 via the node 102, the node 103, the node 202, and the node 203. The standby system path is a path in which links connecting adjacent nodes are connected in such a way that the transmission node and the reception node can be connected to each other. In this case, the NMS 400 controls each node, and thereby MCF connection between nodes is changed in such a way that the standby system path is configured.

Figure 4:
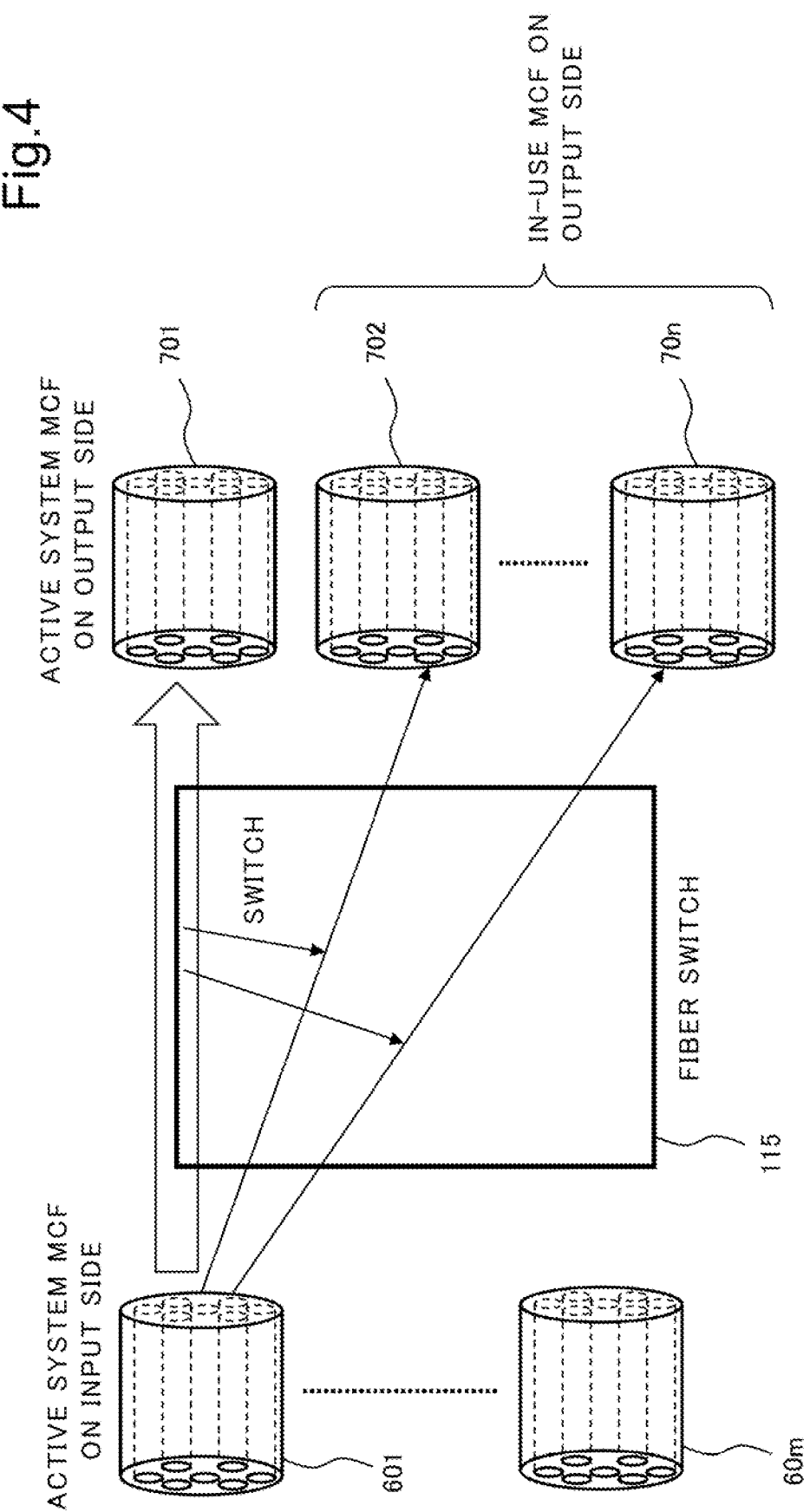
FIG. 4 is a diagram for explaining switching from the active system to the standby system according to the first example embodiment.
Figure 5:
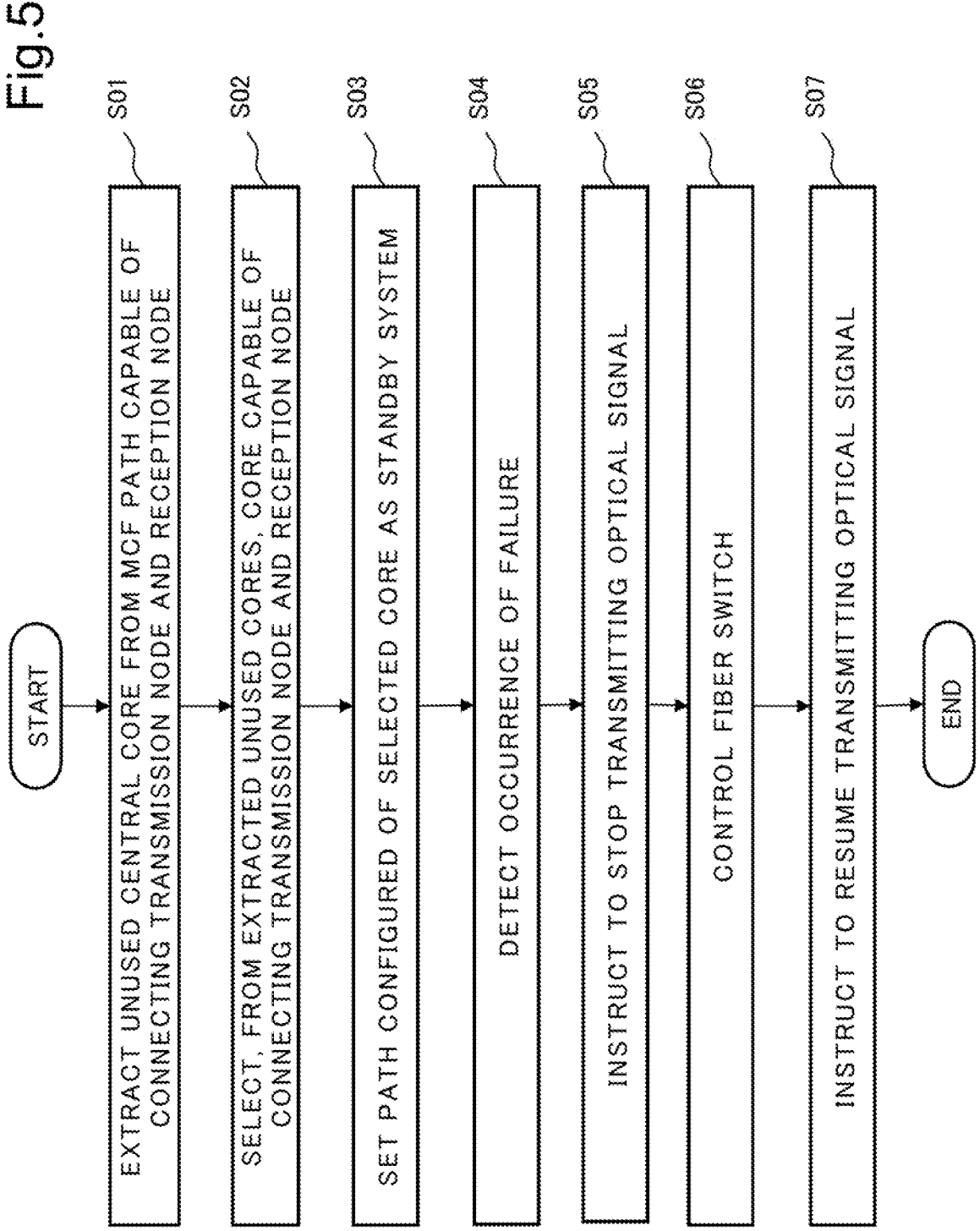
FIG. 5 is a flowchart illustrating an example of a procedure of switching from the active system to the standby system according to the first example embodiment.

FIG. 4 is a diagram for explaining switching from the active system path to the standby system path according to the present example embodiment. In FIG. 4, a portion relevant to MCF switching extracted from the configuration diagram of the node 101 in FIG. 2 is illustrated, and illustration of a fan-out, a fan-in, and a transponder is omitted. FIG. 4 illustrates an example in which a plurality of seven-core MCFs are connected to a node. The MCF701 (active system MCF on an output side) is used for transmission of an optical signal by an active system path. Not all cores of the MCF 702 to 70n (in-use MCFs on the output side) are unused, and some of the cores are used for transmission of an optical signal using another path. The NMS 400 stores information on whether each core included in the MCFs 702 to 70n is in use or unused, and sets a standby system path using an unused core of the MCF 702 to 70n. FIG. 5 is a flowchart illustrating an example of a procedure of switching from the active system to the standby system.

Setting of a standby system path in the NMS 400 is described. The NMS 400 extracts, based on path information held by the NMS 400, information on a plurality of MCFs capable of connecting a transmission node to a reception node, for each link between nodes. Further, the NMS 400 extracts, for each link between nodes an unused core in a path configured of these connectable MCFs (step S01 in FIG. 5). Next, the NMS 400 selects, from the extracted unused cores, a core capable of connecting, as a path, the transmission node to the reception node (step S02). Then, the NMS 400 sets a path configured of the extracted connectable cores as a standby system (step S03). FIG. 4 illustrates an example in which a seven-core MCF is used in the network 1. In a node whose optical signal output destination is changed to an MCF other than the MCF 701 due to switching to the standby system path, paths of seven cores of the MCF 601 are distributedly disposed at cores of the MCF 702 to 70n which are seven in maximum excluding the MCF 701, and are set as standby system paths. Specifically, a core of a standby system path is disposed, for each link, at an unused core of the MCFs 702 to 70n in each node. The NMS 400 sets a plurality of standby system paths for each combination of a transmission node and a reception node. The above-described procedure may be executed in a design phase of the network 1.

The node controller 120 of a node that is a transmission destination of the MCF 701 is capable of detecting, for each MCF, a failure in the MCFs 601 to 60m on the input side, based on a decrease in a level of an optical signal detected by the monitor 119. The node controller 120 notifies the NMS 400 of information on an MCF from which a failure is detected. When detecting, based on a notification from each node, occurrence of a failure and a point where the failure occurs (step S04), the NMS 400 extracts, from path information, nodes configuring an active system path using an MCF from which the failure is detected. Further, the NMS 400 instructs the transmission node to stop transmitting an optical signal (step S05), and controls the fiber switches 115 of nodes on the active system path and nodes on the standby system path in such a way that the active system path switches to the standby system path (step S06). As the standby system path, a path that does not pass through the point where the failure occurs is selected. Control on the fiber switches 115 by the NMS 400 is performed via the node controller 120. Thereby, setting of a standby system path is completed. When confirming that setting of the standby system path is completed in all nodes, the NMS 400 instructs the transmission node to resume transmitting an optical signal (step S07).

Note that, in a network environment in which both an MCF and a SMF are present in an optical transmission path (specifically, a heterogenous network environment), a standby system may be formed while one SMF is regarded as one core of an MCF.

The first example embodiment enables easy construction of a standby system path in the network 1 using an MCF. A reason for this is that a standby system path can be configured, by using an unused core, without installing an MCF dedicated for the standby system path.

Another Expression of Network 1 According to First Example Embodiment

The network 1 described in the first example embodiment may be described as follows. Specifically, the network 1 is a network including an active system path and a standby system path. The active system path is a path between a transmission node and a reception node connected by a first MCF. The standby system path is a path configured in such a way as to include a second MCF different from the first MCF, and is a path that can be switched to from the active system path. Further, a core to which each of a plurality of cores of the first MCF is switched is disposed at an unused core of the second MCF.

A network provided with such a configuration can also configure, by using an unused core, a standby system path without installing an MCF dedicated for the standby system path, and therefore enables easy construction of a standby system path. Further, a management procedure of the network according to the present example embodiment may be achieved by a network management device such as the NMS 400.

Second Example Embodiment

Figure 6:
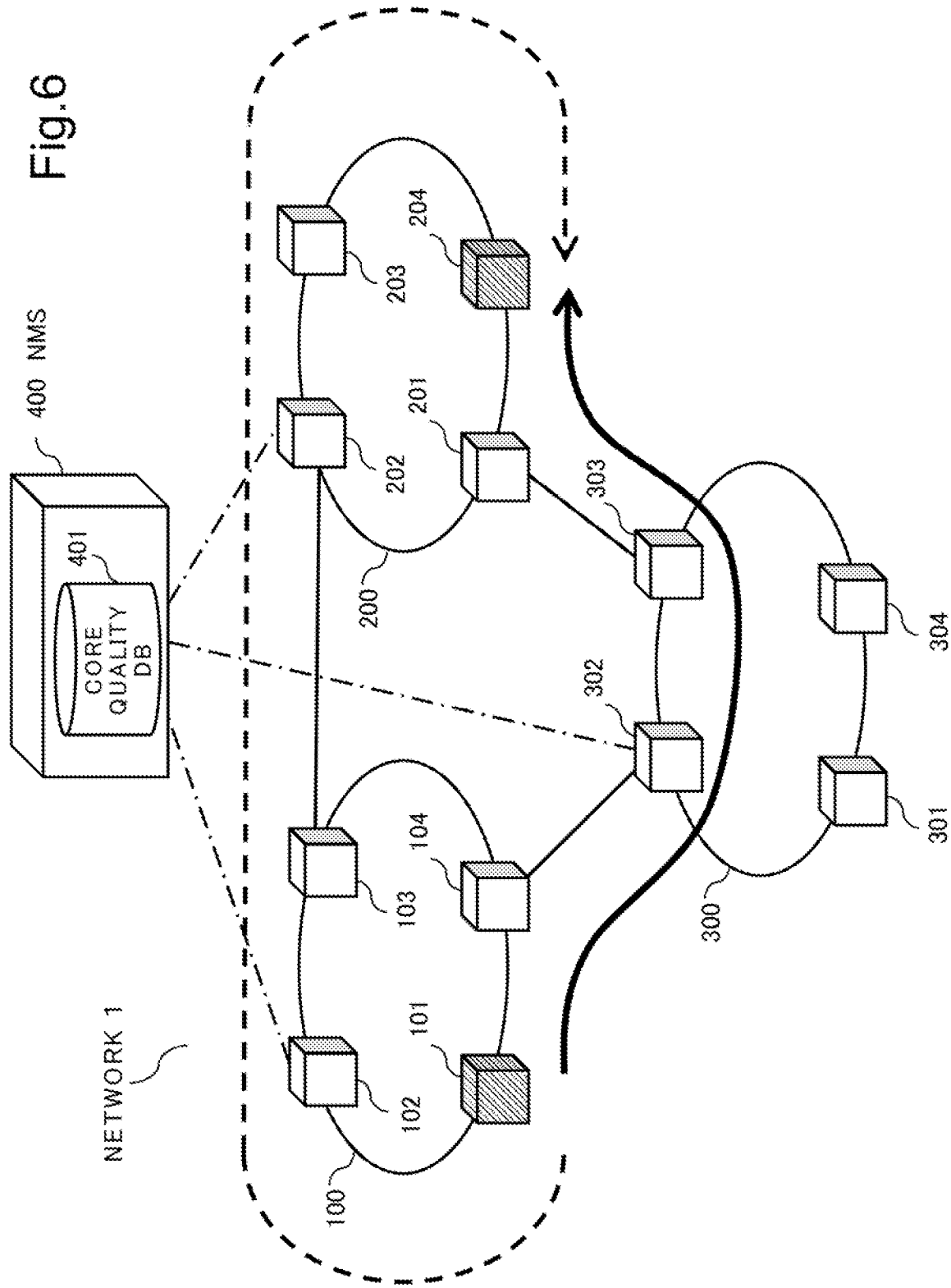
FIG. 6 is a diagram illustrating a configuration example of a network 1 according to a second example embodiment.

Next, a second example embodiment of the present invention is described in detail with reference to FIG. 6. FIG. 6 is a diagram illustrating a configuration example of the network 1 according to the second example embodiment. In the present example embodiment, the NMS 400 includes a core quality database (DB) 401. The core quality database 401 has quality data of each core, regarding an MCF configuring the network 1. The quality data are, for example, a position of a core in an MCF (for example, whether the core is placed near a center of the MCF or placed near a surface of the MCF), but are not limited thereto. Even in a case of an uncoupled multicore fiber, in order to suppress interference from an optical signal propagating through another core in a vicinity, it is preferable to avoid using a core near a center as much as possible. Therefore, the NMS 400 according to the present example embodiment refers to the core quality database 401, allocates a core near a surface of an MCF, whose transmission characteristic is relatively good, to an active system and allocates a core near a center of the MCF (central core), whose transmission characteristic is relatively poor, to a standby system.

Description on Operation

Figure 7:
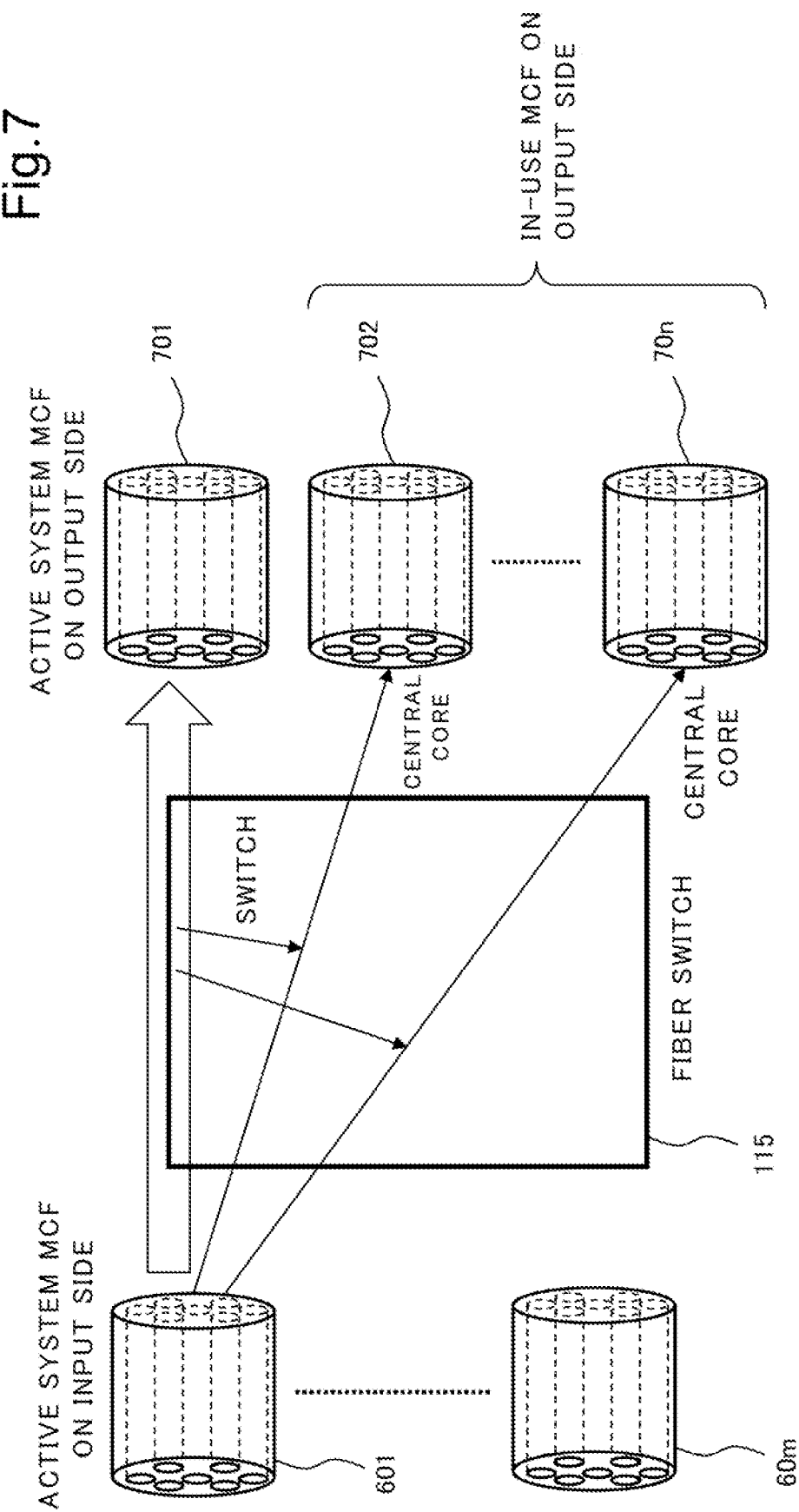
FIG. 7 is a diagram for explaining switching from an active system to a standby system according to the second example embodiment.
Figure 8:
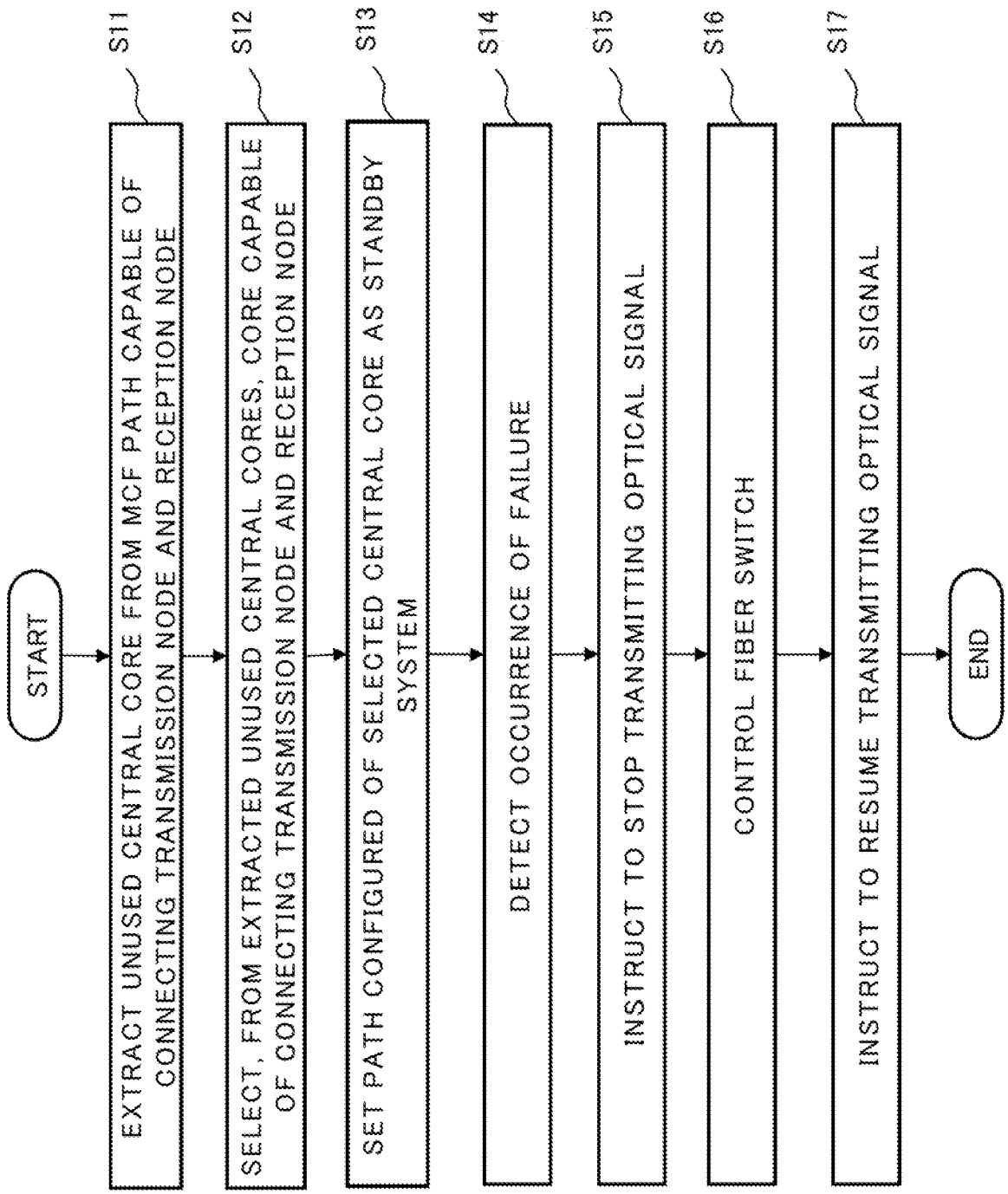
FIG. 8 is a flowchart illustrating an example of a procedure of switching from the active system to the standby system according to the second example embodiment.

Next, the second example embodiment is described with reference to FIGS. 6, 7, and 8. FIG. 6 is a diagram illustrating a configuration example of the network 1 according to the second example embodiment. FIG. 7 is a diagram for explaining switching from an active system to a standby system according to the present example embodiment. In FIG. 7, similar to FIG. 4, illustration of a fan-out, a fan-in, and the like is omitted. FIG. 8 is a flowchart illustrating an example of a procedure of switching from the active system to the standby system according to the present example embodiment. In the following, description on a component and an operation that are common to the first example embodiment is omitted as appropriate, and a difference from the first example embodiment is mainly described.

Regarding an active system path, as described above, the NMS 400 configures an active system path by using a core among cores of a MCF (for example, a core near a surface of the MCF), whose transmission characteristic is relatively good. Regarding a standby system path, the NMS 400 refers to path information held by the NMS 400, and the core quality database 401, and extracts an unused central core from a path of a plurality of MCFs capable of connecting a transmission node to a reception node (step S11 in FIG. 8). Next, the NMS 400 extracts, from the extracted unused central cores, a central core capable of connecting the transmission node to the reception node (step S12). Then, the NMS 400 sets a path configured of the extracted connectable central core and connecting the transmission node and the reception node, as a standby system (step S13). As an example, a case in which a seven-core MCF is used as illustrated in FIG. 7 is considered. In this case, in each node, connection destinations of cores of a MCF 601 on an input side are distributedly disposed at central cores of seven MCFs 702 to 70*n* excluding a MCF 701 (active system path) in which a failure occurs, on an output side. When there is no core at a center of the MCF, a core near the center of the MCF may be selected as a central core. For example, a core within a predetermined range from the center of the MCF is selected as a central core. Further, a path to the reception node configured of the central cores of the MCFs 702-70*n* is stored in the NMS 400 as a standby system path. The above-described procedure may be performed in a design phase of the network 1.

Next, when the NMS 400 detects occurrence of a failure (step S14), the NMS 400 instruct the transmission node to stop transmitting an optical signal (step S15). Further, the NMS 400 controls the fiber switch 115 of each node in such a way as to perform switching from the active system path to the standby system path (step S16). A path that does not pass through a point where the failure occurs is selected as the standby system path. Thereby, setting of the standby system path is completed. When confirming that setting of the standby system path is completed in all nodes, the NMS 400 instructs the transmission node to resume transmitting an optical signal (step S17).

Similar to the first example embodiment, the network 1 according to the second example embodiment also configures a standby system path by using an unused core. Therefore, a standby system path can be easily configured without installing an MCF dedicated for the standby system path.

Further, in the network 1 according to the second example embodiment, a standby system path is configured by using a central core. Therefore, in the network 1 according to the second example embodiment, when a new path is prepared due to additional node installation, a possibility that a core whose transmission characteristic is relatively good is used is increased.

Third Example Embodiment

Figure 9:
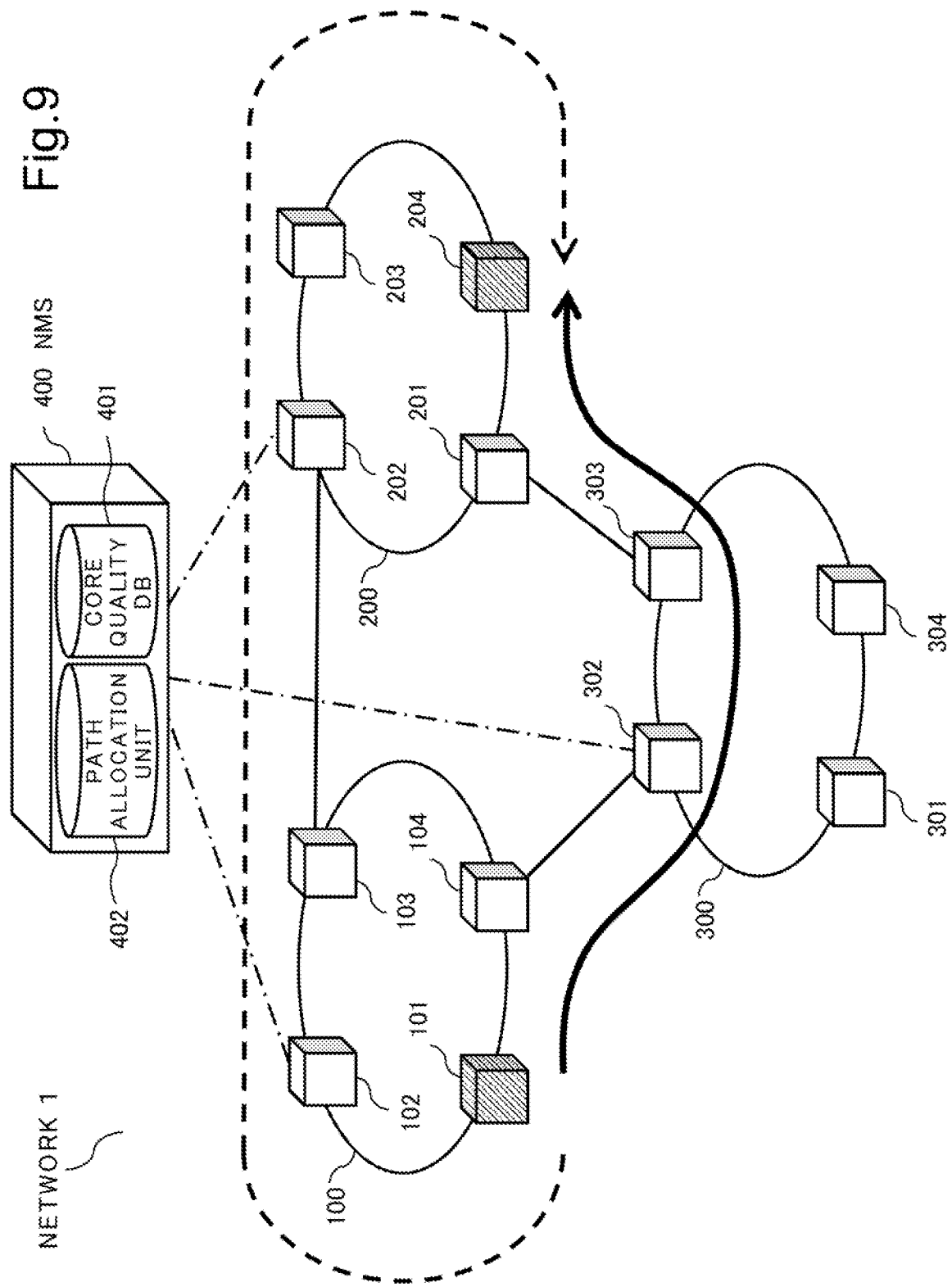
FIG. 9 is a diagram illustrating a configuration example of a network 1 according to a third example embodiment.

FIG. 9 is a diagram illustrating a configuration example of a network 1 according to a third example embodiment. In the present example embodiment, the NMS 400 includes a path allocation unit 402 in addition to the core quality database 401. The path allocation unit 402 refers to the core quality database 401, and determines possibility that a path from a transmission node reaches to a reception node. Further, in the present example embodiment, the core quality database 401 has transmission quality data for each core of an MCF configuring the network 1. The transmission quality data include data on propagation characteristic such as a core loss, a nonlinear distortion, which affects high-speed transmission, and the like. The path allocation unit 402 collates, for example, transmission quality data of a core configuring a path with a transmission rate of an optical signal (100 gigabit per second (Gbps), 400 Gbps, and the like) and transmission distance of the optical signal, and thereby determines reachability of the path. Rest of the configuration is similar to those in the second example embodiment.

Description on Operation

Figure 10:
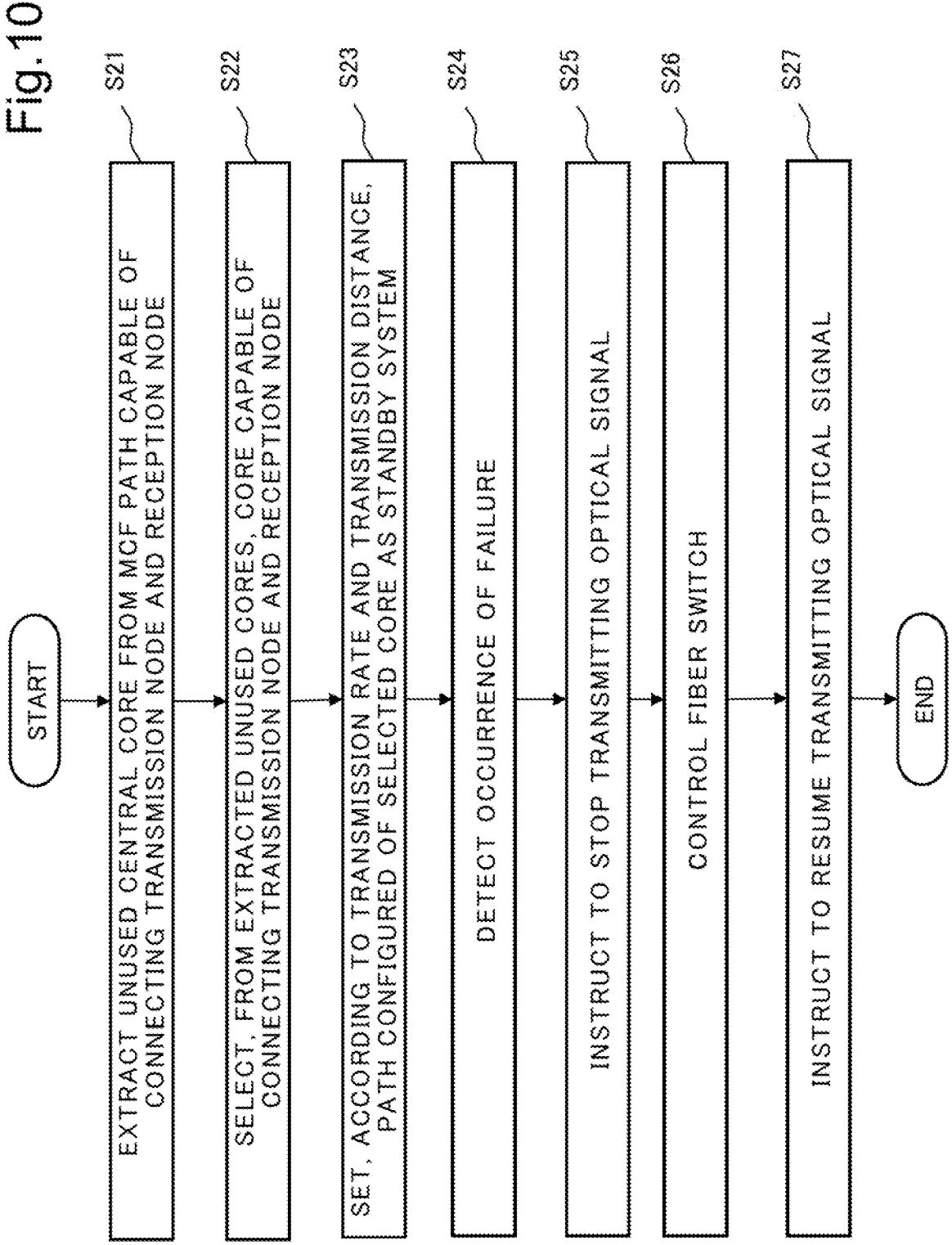
FIG. 10 is a flowchart illustrating an example of a procedure of switching from an active system to a standby system according to the third example embodiment.

FIG. 10 is a flowchart illustrating an example of a procedure of switching from an active system to a standby system according to the third example embodiment. The NMS 400 refers to path information held by the NMS 400, and the core quality database 401, and extracts an unused core from a path of a plurality of MCFs capable of connecting a transmission node to a reception node (step S21 in FIG. 10). Next, the NMS 400 extracts, from the extracted unused cores, a core capable of connecting the transmission node to the reception node (step S22). The path allocation unit 402 refers to the core quality database 401, and sets a reachable path among the extracted connectable cores as a standby system path, according to a transmission rate and a transmission distance (step S23). The path allocation unit 402 may configure a standby system path by using a core other than a core having a best propagation characteristic, in each MCF configuring a path.

Here, there is a case in which transmission quality is different for each link (connection between adjacent nodes) configuring a path, depending on individual difference of a MCF and a position of a selected node MCF. For example, in a path illustrated in a dashed line in FIG. 9, a transmission quality of a core of a link between the node 101 and the node 102 may be lower than other links. Meanwhile, a transmission quality of a core of a links between the node 102, node 103, and the node 202 may be relatively moderate, and a transmission quality of a core of links between the node 202, the node 203, and the node 204 may be relatively high. Therefore, when a transmission distance is a short distance and a transmission speed is low, the path allocation unit 402 may configure a standby system path by connecting cores having relatively low transmission quality. Meanwhile, when the transmission distance is long and the transmission speed is high, the path allocation unit 402 may configure a standby system path by connecting cores having relatively high transmission quality. In this way, the path allocation unit 402 selects, for each link, an MCF core of a standby system, according to a transmission distance and a transmission rate of an optical signal. Further, when a transmission rate of an optical signal is relatively high, a core having low nonlinear distortion may be selected. When a distance between a transmission node and a reception node is relatively long, a core having less loss may be selected. Specifically, the path allocation unit 402 refers to the core quality database 401, and may set a path through which an optical signal can be delivered, as a standby system path, according to at least one of a transmission speed and a transmission distance of the optical signal.

Returning to FIG. 10, when the NMS 400 detects occurrence of a failure (step S24), the NMS 400 instructs the transmission node to stop transmitting an optical signal (step S25). Further, the NMS 400 controls the fiber switch 115 of each node in such a way as to perform switching from an active system path to a standby system path (step S26). A path that does not pass through a point where the failure occurs is selected as the standby system path. Thereby, setting of a standby system path is completed. When confirming that setting of the standby system path is completed in all nodes, the NMS 400 instructs the transmission node to resume transmitting an optical signal (step S27).

Similar to the first and second example embodiments, the network 1 according to the third example embodiment also configures a standby system path by using an unused core. Therefore, a standby system path can be easily configured without installing an MCF dedicated for the standby system path.

Further, in the network 1 according to the third example embodiment, a reachable path is set as a standby system path, according to a transmission rate and a transmission distance. In the network 1 according to the third example embodiment, since a more suitable core is selected according to a characteristic of an optical signal, a core having a good transmission characteristic can be allocated to a high-speed optical signal or an optical signal whose transmission distance is long.

Fourth Example Embodiment

Figure 11:
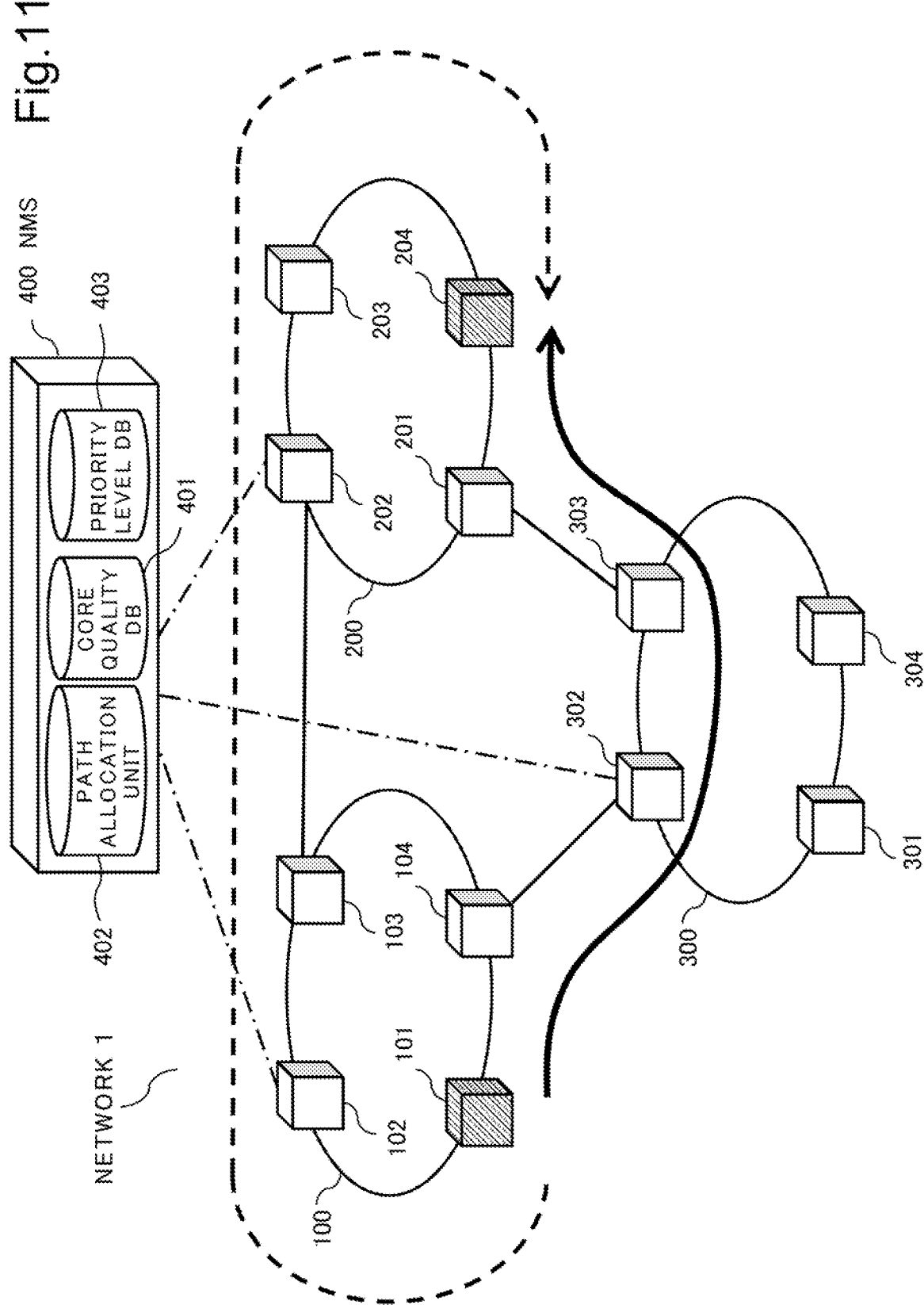
FIG. 11 is a diagram illustrating a configuration example of a network 1 according to a fourth example embodiment.

FIG. 11 is a diagram illustrating a configuration example of a network 1 according to a fourth example embodiment. In the fourth example embodiment, the NMS 400 includes a priority level database 403 in addition to a core quality database 401 and the path allocation unit 402. The priority level database 403 holds a priority level of preparing a standby system path for each path that is set in the network 1. In the present example embodiment, the path allocation unit 402 refers to the core quality database 401 and the priority level database 403, and sets a standby system path, according to a priority level of a path in addition to, for example, a transmission rate and a transmission distance of a signal to be transmitted and received. Other components are similar to those in the third example embodiment.

Description on Operation

Figure 12:
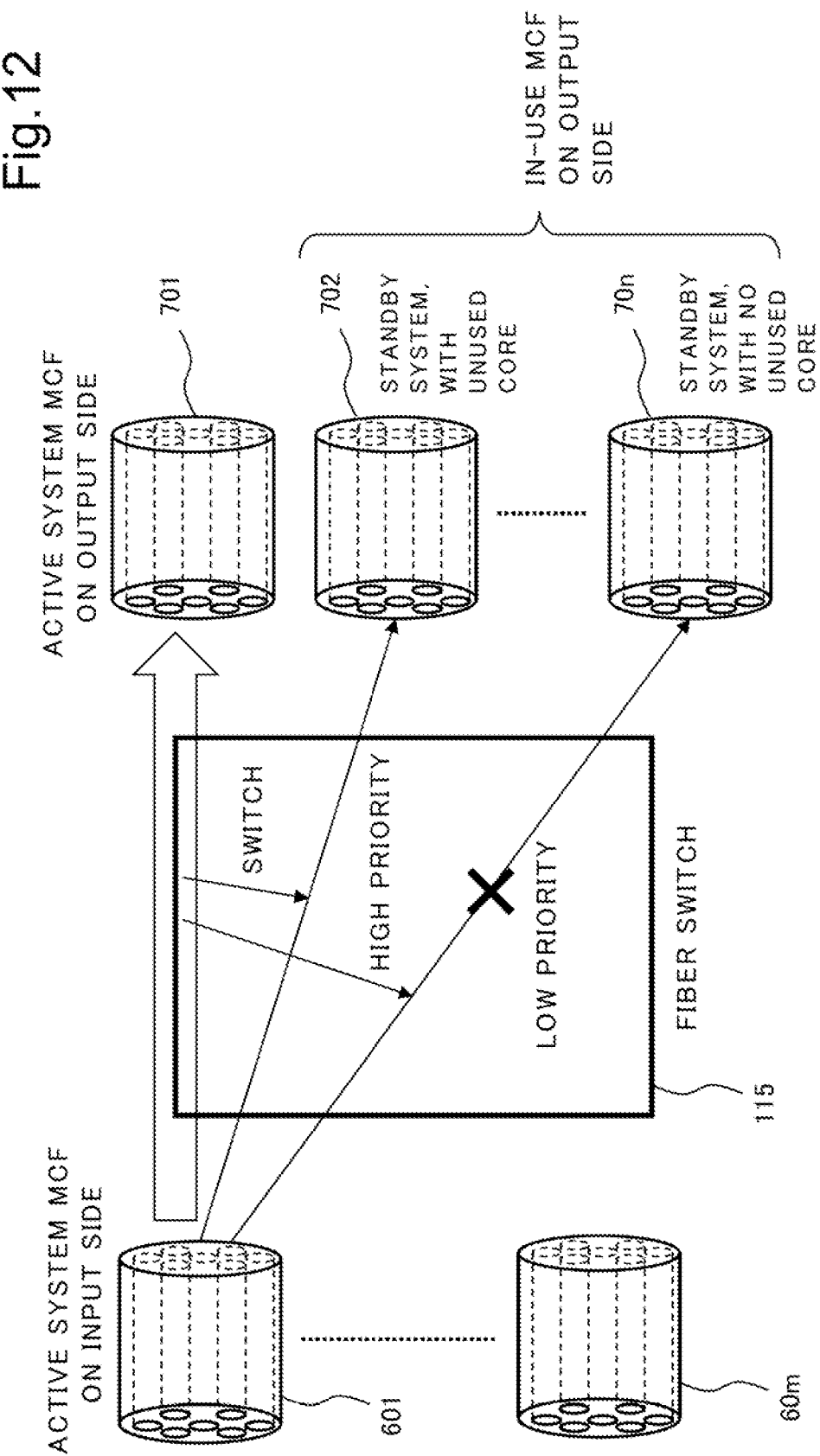
FIG. 12 is a diagram for explaining switching from an active system to a standby system according to the fourth example embodiment.
Figure 13:
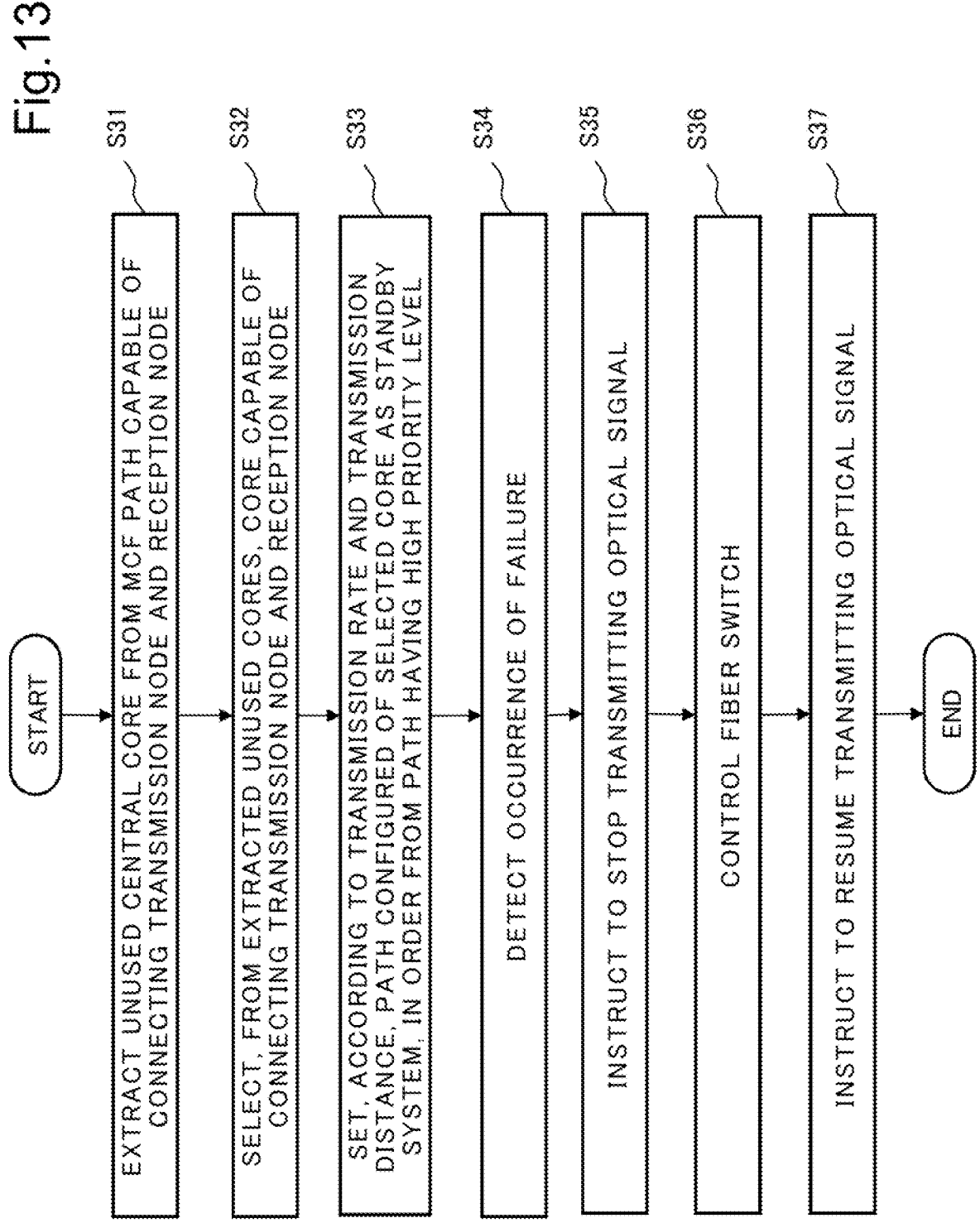
FIG. 13 is a flowchart illustrating an example of a procedure of switching from the active system to the standby system according to the fourth example embodiment.
Figure 14:
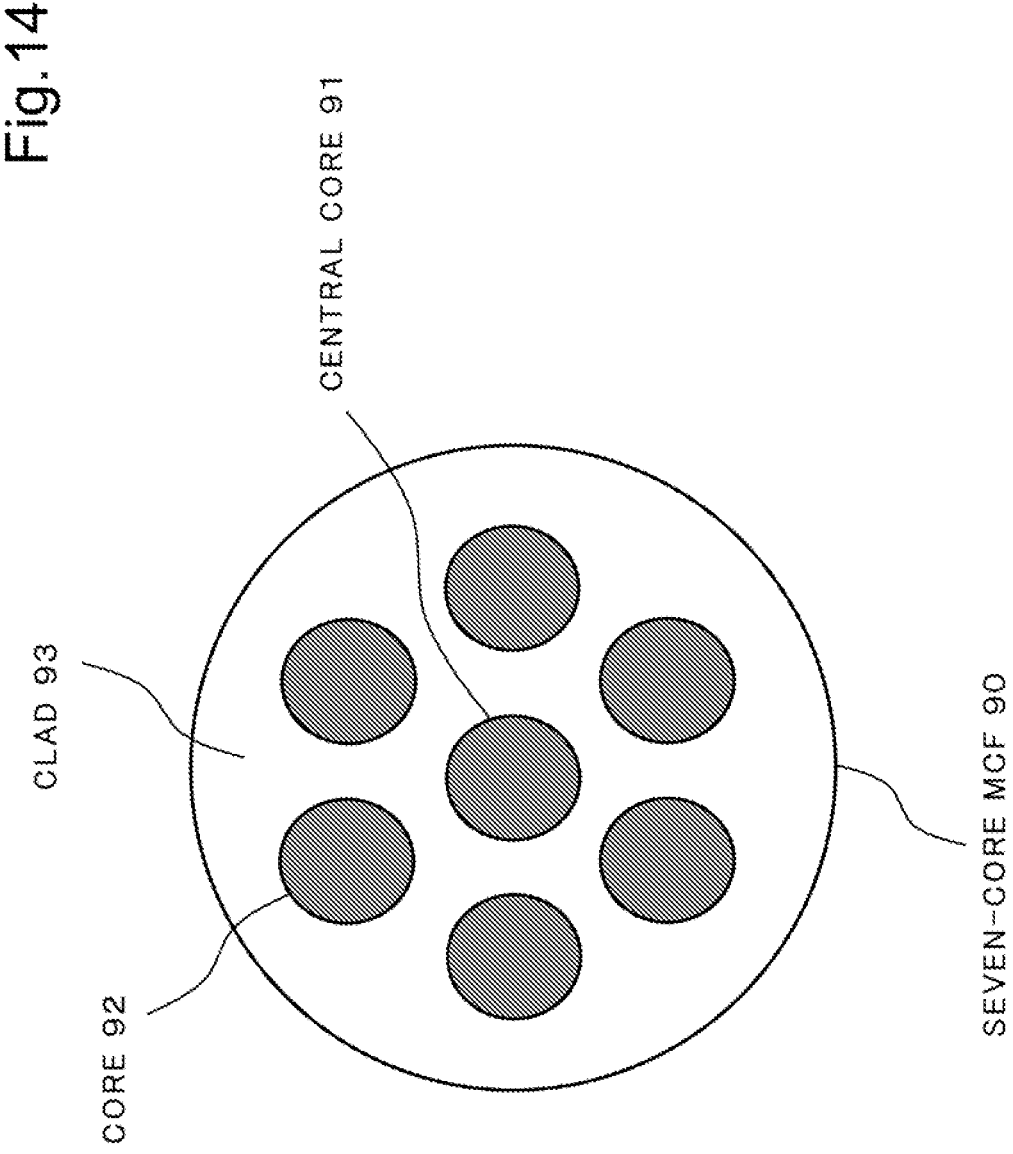
FIG. 14 is a structure diagram of a typical seven-core multicore optical fiber.
Figure 15:
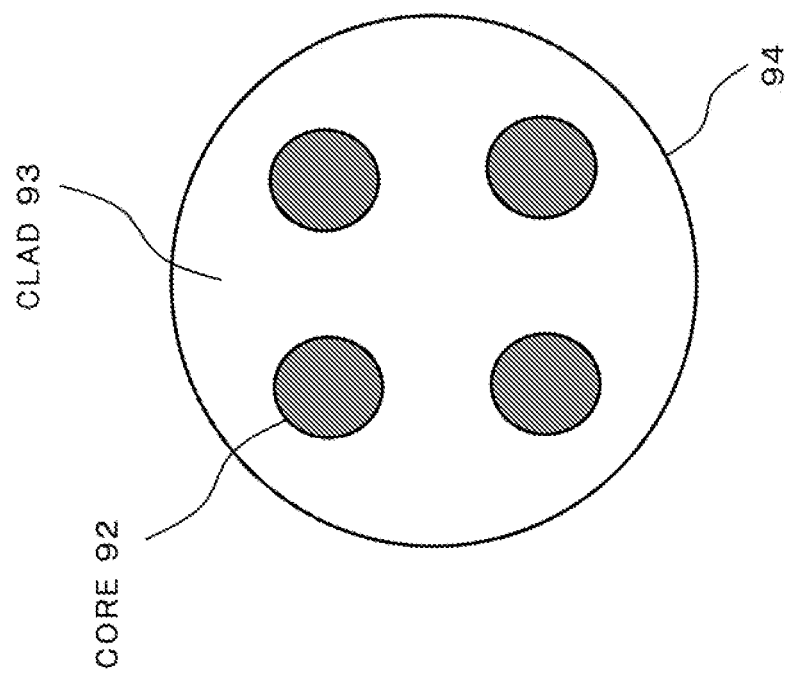
FIG. 15 is a structure diagram of a typical four-core uncoupled multicore optical fiber.
Figure 16:
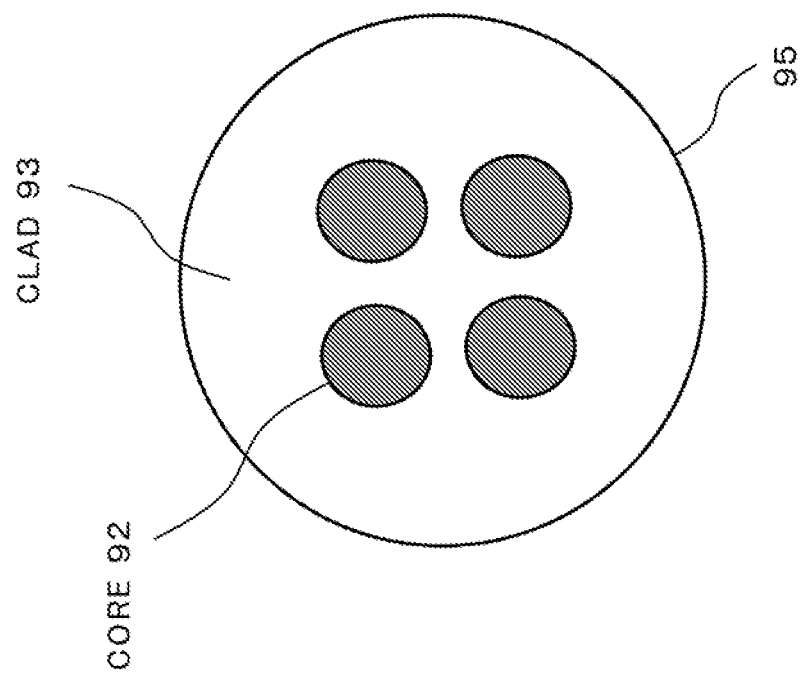
FIG. 16 is a structure diagram of a typical four-core coupled multicore optical fiber.
Figure 17:
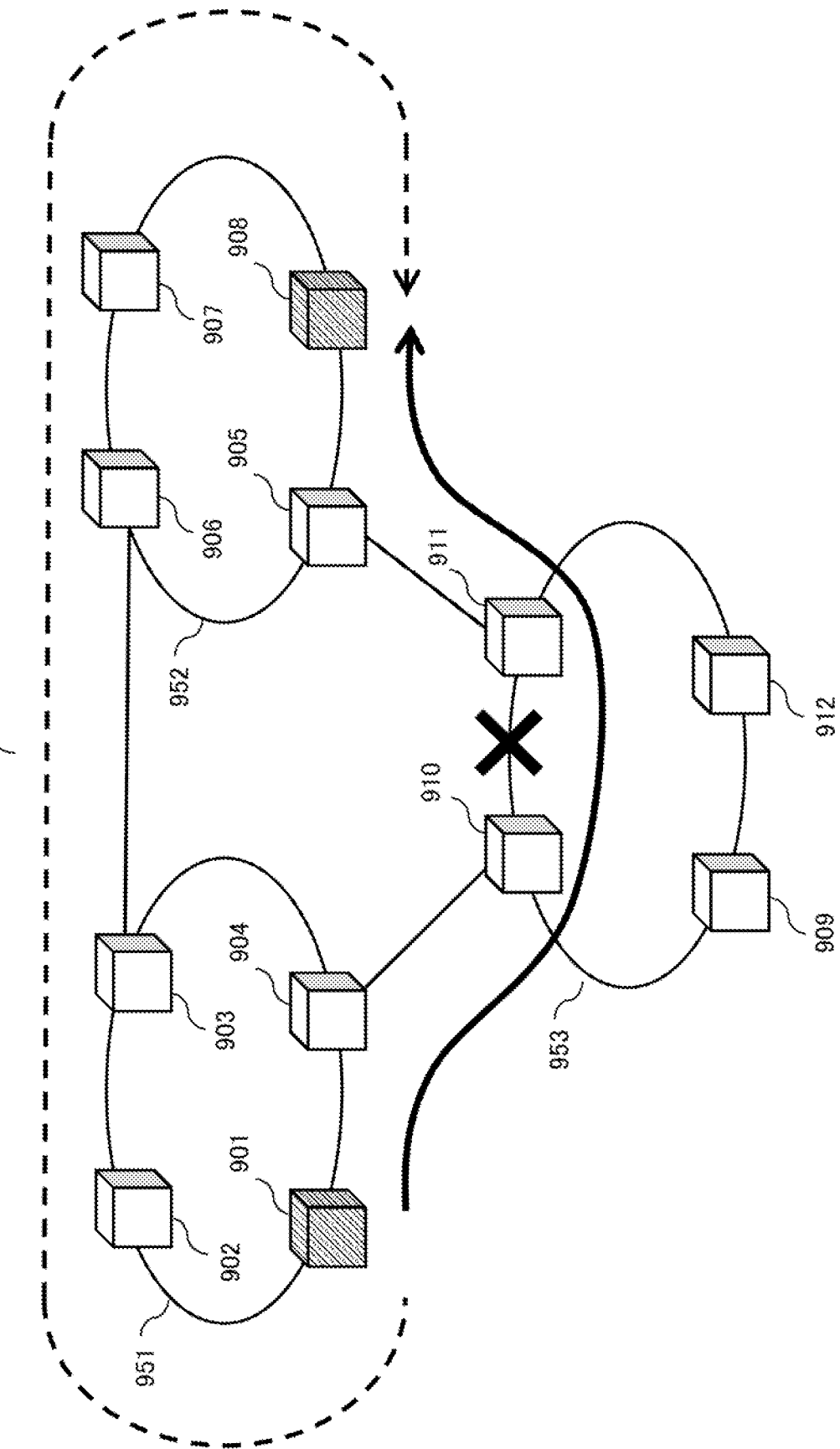
FIG. 17 is a configuration diagram of a typical optical network using a multicore optical fiber.

Next, the fourth example embodiment is described with reference to FIGS. 11, 12, and 13. FIG. 12 is a diagram for explaining switching from an active system to a standby system. FIG. 13 is a flowchart illustrating an example of a procedure of switching from an active system to a standby system.

The NMS 400 refers to path information held by the NMS 400, and the core quality database 401, and extracts an unused core from a path of a plurality of MCFs capable of connecting a transmission node to a reception node (step S31 in FIG. 13). Next, the NMS 400 extracts a core capable of connecting the transmission node to the reception node from the extracted unused cores (step S32). Further, the path allocation unit 402 refers to the core quality database 401 and the priority level database 403, and sets a path among the extracted connectable cores, as a standby system path, according to a transmission rate and a transmission distance, in an order from a path having a high priority level (step S33). Herein, core selection according to a transmission rate and a transmission distance can be performed as in the procedure described in the third example embodiment.

In the present example embodiment, the path allocation unit 402 allocates a path configured of a selected core to a standby system path, in an order from a path having a high priority level. For example, when a plurality of standby system paths can be allocated to one core in a certain link, the NMS 400 allocates a selected core to a path having a higher priority level (specifically, a high-priority path). For a path having a lower priority level (specifically, a low-priority path) another unused core is allocated to a standby system path. When there is no unused core, a standby system path for a low-priority path is not set.

When the NMS 400 detects occurrence of a failure (step S34), the NMS 400 instructs the transmission node to stop transmitting an optical signal (step S35). Further, the NMS 400 controls the fiber switch 115 of each node in such a way as to perform switching from an active system path to the standby system path (step S36). A path that does not pass through a point where the failure occurs is selected as the standby system path. Thereby, setting of a standby system path is completed. When confirming that setting of a standby system path is completed in all nodes, the NMS 400 instructs the transmission node to resume transmitting an optical signal (step S37).

Similar to the first to third example embodiments, the network 1 according to the fourth example embodiment also configures a standby system path by using an unused core. Therefore, a standby system path can be easily configured without installing an MCF dedicated for the standby system path.

Further, in the network 1 according to the fourth example embodiment, a standby system path is set according to a priority level. In the network 1 according to the fourth example embodiment, since a standby system is set to a path having a high priority level, reliability of a path that transmits an important optical signal can be improved by setting a high priority level to the path that transmits an important optical signal.

Note that, the example embodiments of the present invention may be described as the following supplementary notes, but are not limited thereto.

Supplementary Note 1

An optical network including:
an active system path being a path between a transmission node that transmits an optical signal and a reception node that receives the optical signal being connected by a first multicore optical fiber; and
a standby system path connecting the transmission node and the reception node while including a plurality of second multicore optical fibers different from the first multicore optical fiber and is a path that is able to be switched from the active system path, wherein
a core to which a plurality of cores of the first multicore optical fiber are to be switched is disposed at each of a plurality of unused cores of the second multicore optical fiber.

Supplementary Note 2

The optical network according to supplementary note 1, wherein cores of the standby system path are distributedly disposed at unused cores of a plurality of the second multicore optical fibers.

Supplementary Note 3

The optical network according to supplementary note 1 or 2, further including:
a core quality database storing quality data of each core of a plurality of the second multicore optical fibers; and an allocation means for disposing, based on the quality data, a core of the standby system path, at a plurality of the second multicore optical fibers.

Supplementary Note 4

The optical network according to supplementary note 3, wherein
the quality data includes information on disposition of cores of a plurality of the second multicore optical fibers, and
the allocation means disposes, based on the quality data, a core of the standby system path at a core closest to a center in a plurality of the second multicore optical fibers.

Supplementary Note 5

The optical network according to supplementary note 3 or 4, wherein
the quality data includes a propagation characteristic of a core of the second multicore optical fiber, and
the allocation means disposes a core of the standby system path at a core other than a core having the propagation characteristic that is best in a plurality of the second multicore optical fibers.

Supplementary Note 6

The optical network according to any one of supplementary notes 3 to 5, wherein
the allocation means refers to the quality data, and sets, according to at least one of a transmission speed of the optical signal and a transmission distance of the optical signal, a path through which the optical signal is able to be delivered, as the standby system path.

Supplementary Note 7

The optical network according to any one of supplementary notes 3 to 6, wherein
the allocation means disposes a core of the standby system path at the second multicore optical fiber, according to a priority level of preparing the standby system path.

Supplementary Note 8

The optical network according to any one of supplementary notes 3 to 7, further including
a network management device including at least one of the core quality database and the allocation means.

Supplementary Note 9

A network management device:
being used in an optical network including an active system path, which is a path between a transmission node and a reception node being connected by a multicore optical fiber and a standby system path, between the transmission node and the reception node, being a path that is able to be switched from the active system path; and
disposing, at each of a plurality of unused cores of the multicore optical fiber, a core to which a plurality of cores of the active system path are to be switched.

Supplementary Note 10

The network management device according to supplementary note 9, wherein
cores of the standby system path are distributedly disposed at unused cores of a plurality of the multicore optical fibers.

Supplementary Note 11

The network management device according to supplementary note 9 or 10, further including:
a core quality database storing quality data of each core of the multicore optical fiber; and
an allocation means for disposing, based on the quality data, a core of the standby system path at the multicore optical fiber.

Supplementary Note 12

A network management method including,
in an optical network including an active system path, which is a path between a transmission node and a reception node being connected by a multicore optical fiber and a standby system path, between the transmission node and the reception node, being a path that is able to be switched from the active system path,
disposing, at each of a plurality of unused cores of the multicore optical fiber, a core to which a plurality of cores of the active system path are to be switched.

Supplementary Note 13

The network management method according to supplementary note 12, further including
distributedly disposing cores of the standby system path, at unused cores of a plurality of the multicore optical fibers.

Supplementary Note 14

The network management method according to supplementary note 12 or 13, further including
disposing, based on quality data of each core of the multicore optical fiber, a core of the standby system path, at the multicore optical fiber.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, a configuration described in each example embodiment are not necessarily exclusive of each other. An action and the advantageous effect of the present invention may be achieved by a configuration in which all or some of the above-described example embodiments are combined.

A function and a procedure described in each of the above-described example embodiments may be achieved by a central processing unit (CPU) provided in the NMS 400 and each node, executing a program. The program is recorded on a fixed non-transitory recording medium. A semiconductor memory or a fixed magnetic disk device is used as the recording medium, but the recording medium is not limited thereto.

This application is based upon and claims the benefit of priority from Japanese patent application No. 2020-153426, filed on Sep. 14, 2020, the disclosure of which is incorporated herein in its entirety by reference.

REFERENCE SIGNS LIST 1, 100, 200, 300, 900 Network
101 to 104, 201 to 204, 301 to 304, 901 to 912 Node
111 Fan-out
112 Fan-in
113 to 114 Single mode optical fiber (SMF)
115 Fiber switch
116 Wavelength switch
117 Transponder
118 Tap coupler
119 Monitor
120 Node controller
400 Network management device (NMS)
401 Core quality database
402 Path allocation unit
403 Priority level database
601 to 60m, 701 to 70n Multicore optical fiber (MCF)
91 Central core
92 Core
93 Clad
951 to 953 Ring network

What is claimed is:

1. An optical network comprising:
an active system path between a transmission node configured to transmit an optical signal and a reception node configured to receive the optical signal via a plurality of first cores of a first multicore optical fiber being switchably connected to a plurality of active second cores of a second multicore optical fiber;
a standby system path configured to connect the transmission node and the reception node via the first cores of the first multicore optical fiber being switchably connected to a plurality of standby second cores of the second multicore optical fiber, the active system path switchable to the standby system path;
a core quality database configured to store quality data of the first cores, the active second cores, and the standby second cores; and
an allocation circuit configured to switchably connect, based on the quality data, the first cores from the active second cores to the standby second cores to switch the active system path to the standby system path.

2. The optical network according to claim 1, wherein the standby second cores of the standby system path are distributedly disposed within the second multicore optical fiber.

3. The optical network according to claim 1, wherein the quality data includes information on disposition of the active second cores and the standby second cores of the second multicore optical fiber, and
the allocation circuit switchably connects disposes, based on the quality data, one of the first cores to the standby second core closest to a center of the second multicore optical fiber.

4. The optical network according to claim 1, wherein the quality data includes a propagation characteristic of the first cores, the active second cores, and the standby second cores, and
the allocation circuit switchably connects one of the first cores to one of the standby second cores other than the standby second core core having the propagation characteristic that is best.

5. The optical network according to claim 1, wherein the allocation circuit sets, based on the quality data and at least one of a transmission speed of the optical signal and a transmission distance of the optical signal, a path through which the optical signal is able to be delivered, as the standby system path.

6. The optical network according to claim 1, wherein the allocation circuit switchably connects one of the first cores to the standby second core according to a priority level of the standby system path.

7. The optical network according to claim 1, further comprising
a network management device including at least one of the core quality database and the allocation circuit.

8. A network management device,
wherein the network management device is used in an optical network including:
an active system path between a transmission node configured to transmit an optical signal and a reception node configured to receive the optical signal via a plurality of first cores of a first multicore optical fiber being switchably connected to a plurality of active second cores of a second multicore optical fiber;
a standby system path configured to connect the transmission node and the reception node via the first cores of the first multicore optical fiber being switchably connected to a plurality of standby second cores of the second multicore optical fiber, the active system path switchable to the standby system path, and
wherein the network management device comprises:
a core quality database configured to store quality data of the first cores, the active second cores, and the standby second cores; and
an allocation circuit configured to switchably connect, based on the quality data, the first cores from the active second cores to the standby second cores to switch the active system path to the standby system path.

9. The network management device according to claim 8, wherein
the standby second cores of the standby system path are distributedly disposed within the second multicore optical fiber.

10. A network management method,
wherein the network management method is performed in an optical network including:
an active system path between a transmission node configured to transmit an optical signal and a reception node configured to receive the optical signal via a plurality of first cores of a first multicore optical fiber being switchably connected to a plurality of active second cores of a second multicore optical fiber;
a standby system path configured to connect the transmission node and the reception node via the first cores of the first multicore optical fiber being switchably connected to a plurality of standby second cores of the second multicore optical fiber, the active system path switchable to the standby system path, and storing quality data of the first cores, the active second cores, and the standby second cores; and switchably connecting, based on the quality data, the first cores from the active second cores to the standby second cores to switch the active system path to the standby system path.

11. The network management method according to claim 10, wherein the standby second cores of the standby system path are distributedly disposed within the second multicore optical fiber.

* * * * *